United States Patent [19]

Bertiger

[11] Patent Number: 4,538,757
[45] Date of Patent: Sep. 3, 1985

[54] WAVE SOLDERING IN A REDUCING ATMOSPHERE

[75] Inventor: Bary R. Bertiger, Mesa, Ariz.

[73] Assignee: Motorola, Inc., Schaumburg, Ill.

[21] Appl. No.: 518,989

[22] Filed: Aug. 1, 1983

[51] Int. Cl.³ .......................... B23K 1/08; H05K 3/34
[52] U.S. Cl. .................. 228/180.1; 228/220; 228/37
[58] Field of Search .............. 228/37, 180 R, 219, 228/220, 42, 180, 223

[56] References Cited

U.S. PATENT DOCUMENTS

| Re. 30,399 | 9/1980 | Ammann et al. | 228/180 R |
| 2,585,819 | 6/1946 | Moore et al. | 228/220 X |
| 2,674,791 | 4/1950 | Edson et al. | 228/219 |
| 2,822,609 | 2/1958 | Horvitz | 228/220 |
| 3,029,559 | 4/1962 | Treptow | 228/220 |
| 3,078,563 | 2/1963 | Gould et al. | 228/220 |
| 3,356,830 | 12/1967 | Schleer et al. | 228/42 X |
| 3,754,698 | 8/1973 | Bochinski et al. | 228/223 X |
| 4,019,671 | 4/1977 | Akyuerek | 228/180 R |
| 4,119,262 | 10/1978 | Yen et al. | 228/223 X |
| 4,294,395 | 10/1981 | Nayar | 228/220 |
| 4,320,865 | 3/1982 | Batinovich | 228/220 X |
| 4,383,723 | 5/1983 | Schleimann-Jenson | 445/54 |

Primary Examiner—Kenneth J. Ramsey
Assistant Examiner—M. Jordan
Attorney, Agent, or Firm—Raymond J. Warren

[57] ABSTRACT

Wave soldering is accomplished in an enclosure having an atmosphere which is substantially free of oxygen and which provides a fluxing action due to the presence of a gaseous reducing agent. A conveyor carries articles to be soldered through the enclosure by means of an entrance and exit which are provided with gas curtains to inhibit atmosphere exchange with the ambient air.

7 Claims, 1 Drawing Figure

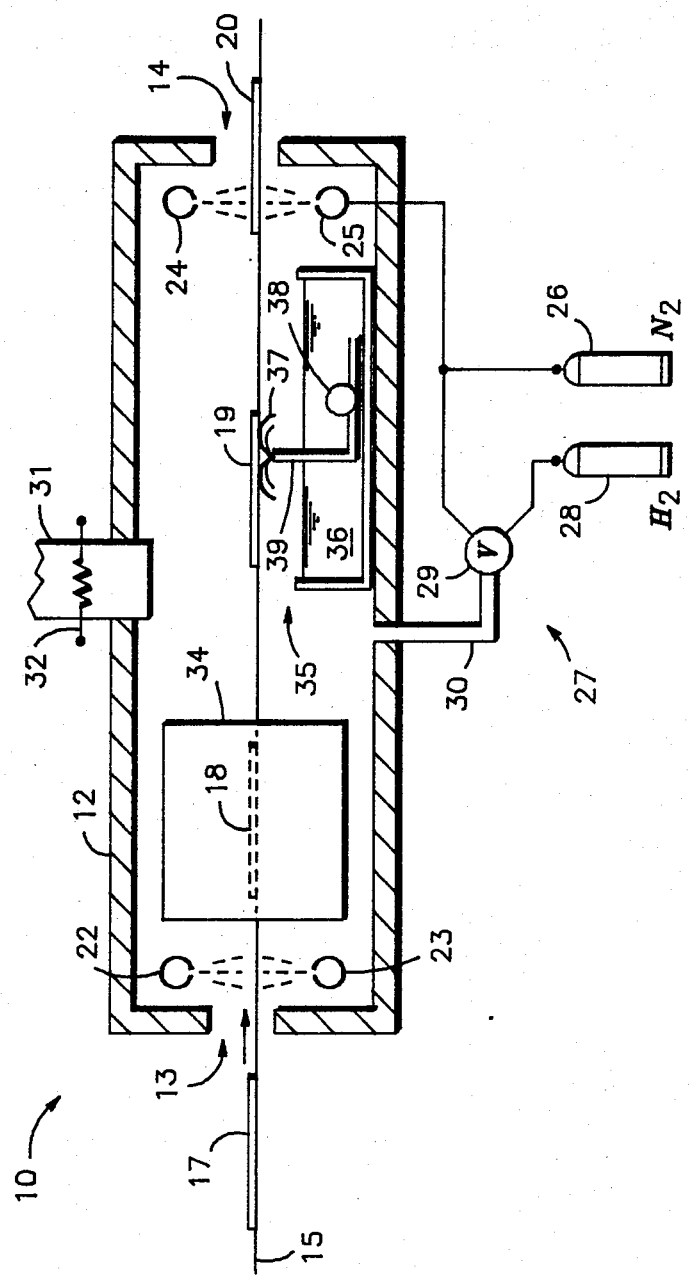

WAVE SOLDERING IN A REDUCING ATMOSPHERE

FIELD OF THE INVENTION

The present invention relates, in general, to a method and apparatus for wave soldering in a reducing atmosphere. More particularly, the invention relates to carrying out a wave soldering operation in an atmosphere which prevents oxide formation and provides a fluxing action.

BACKGROUND OF THE INVENTION

Wave soldering is a widely used technique for high volume soldering of printed circuit boards and the like. One of the problems encountered is the formation of oxides of the tin, lead and other components of the solder. This leads to increased surface tension of the solder and, thereby, to increase bridging. U.S. Pat. No. 3,705,457 issued to Tardoskegyi discloses a method of reducing this problem by aiming a stream of inert gas at the area in which the molten solder and the workpiece intersect, thus inhibiting oxidation. However, this is a relatively complex apparatus requiring fine alignment and does not completely preclude oxidation.

Another disadvantage of present wave soldering techniques involves the use of flux to improve the quality of the solder joints. The flux can contaminate some parts, requiring careful application of the flux and cleaning after the soldering operation.

SUMMARY OF THE INVENTION

Accordingly, it is an object of the present invention to provide an improved wave soldering method and apparatus.

Another object of the present invention is to provide an improved wave soldering technique in which oxide formation is inhibited and the use of flux is unnecessary.

Yet a further object of the present invention is to provide a method of wave soldering in a controlled atmosphere which inhibits oxide formation and provides a fluxing action.

A particular embodiment of the present invention comprises a wave soldering enclosure having $N_2$ gas curtains at the entrance and exit to aid in the control of the inside atmosphere. A conveyor system moves articles to be soldered in through the entrance, through a pre-heating zone, over the solder wave and out the exit. Once inside the $N_2$ gas curtains, the articles and the solder wave are exposed to an atmosphere which is approximately 85% $N_2$ and 15% $H_2$. The exclusion of oxygen prevents oxide formation and the presence of $H_2$ provides a reducing atmosphere which functions similarly to flux. The high proportion of $N_2$ in the mixture reduces the risk of an explosive mixture. A vent with a burnoff is provided to avoid venting an explosive gas.

These and other objects and advantages of the present invention will be apparent to one skilled in the art from the detailed description below taken together with the drawing.

BRIEF DESCRIPTION OF THE DRAWING

The single FIGURE is a cross-sectional view of a controlled atmosphere wave soldering apparatus according to the principles of the present invention.

DETAILED DESCRIPTION OF THE INVENTION

A wave soldering apparatus 10 is contained primarily within an enclosure 12 having an entrance 13 and an exit 14. In a preferrred embodiment of the invention enclosure 12 comprises a stainless steel box. A conveyor apparatus 15 runs through enclosure 12 by means of entrance 13 and exit 14. Articles 17, 18, 19 and 20 are carried on conveyor apparatus 15 through enclosure 12. Articles 17, 18, 19 and 20 may be any articles of the type which are commonly wave soldered. For instance, they may be printed circuit boards. It is common practice when wave soldering to apply a fluxing agent, which is commonly a paste or gel, to the articles to be soldered. No fluxing agent is required to be applied to articles 17, 18, 19 and 20 in the present invention.

Nozzles 22 and 23 disposed around entrance 13 and nozzles 24 and 25 disposed around exit 14 are coupled to a supply 26 of nitrogen gas. Nitrogen is thereby directed from nozzles 22, 23, 24 and 25 to form nitrogen gas curtains immediately inside entrance 13 and exit 14. In this manner, the exchange of gases between the ambient atmosphere and the inside of enclosure 12 is minimized. The atmosphere inside enclosure 12 is further controlled by an atmosphere supply apparatus 27 comprising nitrogen gas supply 26, a hydrogen gas supply 28, a proportioning valve 29 and a gas inlet 30. Valve 29 controls the proportions of the gases in the mixture supplied to enclosure 12 by means of inlet 30 so that the mixture comprises approximately 85% by volume of nitrogen and approximately 15% by volume of hydrogen. In addition, valve 29 maintains pressure of the gas mixture supplied by inlet 30 at a level slightly above ambient atmospheric pressure. A vent apparatus 31 is supplied in a wall of enclosure 12 to remove the excess gases from enclosure 12. Further, a burnoff device 32, which is preferably an electrically heated wire, is disposed in vent 31 to burn off the hydrogen in the vented mixture.

The hydrogen in the gas mixture fed to enclosure 12 provides a fluxing action during the wave soldering procedure. It is possible that other reducing agents which may be used in gaseous form, such as carbon monoxide, may be substituted for hydrogen. In the preferred embodiment, the purpose of the nitrogen in the mixture is to prevent an explosive mixture of hydrogen and oxygen. Since atmosphere supply apparatus 27 supplies a gas mixture which is substantially free of oxygen and since the pressure within enclosure 12 is slightly positive with respect to atmospheric pressure, oxygen is effectively excluded from the interior of enclosure 12. This allows the entire wave soldering procedure to be carried out in a non-oxidizing atmosphere. Furthermore, the presence of a reducing agent such as hydrogen in the atmosphere removes the need for a conventional fluxing agent.

Once inside enclosure 12 the articles to be soldered are first passed through a pre-heating zone 34 in which the temperature of the article is raised to nearly the melting point of the solder. Pre-heating zone 34 may comprise, for instance, an oven. Once through pre-heating zone 34, the articles are immediately passed over a wave soldering apparatus 35. Apparatus 35 comprises a supply of molten solder 36 and means for forming a standing wave of molten solder 37. Such means may comprise, for instance, a pump 38 and a nozzle 39. Other means of forming a standing solder wave are well known in the art and may be substituted. Once past soldering apparatus 35, the articles to be soldered are moved out of enclosure 12 by means of exit 14.

The disclosed apparatus and method for wave soldering eliminates the steps of fluxing and flux cleaning present in prior art wave soldering devices. Furthermore, the invention eliminates the oil intermix which is present in some prior art devices to reduce oxide formation.

I claim:

1. A wave soldering apparatus comprising:
an enclosure having an entrance and an exit;
conveyor means for carrying articles to be soldered through said enclosure, said conveyor means passing through said entrance and exit;
wave soldering means inside said enclosure for soldering said articles on said conveyor means;
atmosphere supply means coupled to said enclosure for maintaining a reducing, non-explosive and oxygen poor atmosphere and providing a fluxing action inside said enclosure;
vent means for venting gases from said enclosure; and
burn-off means for burning a flammable portion of said gases.

2. A wave soldering apparatus according to claim 1 wherein said wave soldering means further comprises:
pre-heating means for raising the temperature of said articles; and
means for forming a standing wave of molten solder, said standing wave being arranged to contact at least a portion of said articles.

3. A wave soldering apparatus according to claim 1 wherein said atmosphere supply means further comprises:
nozzle means for producing gas curtains at said entrance and said exit.

4. A wave soldering apparatus according to claim 1 wherein said atmosphere comprises:
approximately 85% by volume of nitrogen and 15% by volume of hydrogen.

5. A method of wave soldering comprising the steps of:
enclosing a wave soldering apparatus in an enclosure;
providing an atmosphere in said enclosure which substantially precludes the presence of oxygen and which provides a flexing action;
moving articles to be soldered through said enclosure and performing a wave soldering operation therein
venting said gases from said enclosure; and
burning off a flammable portion of said vented gases.

6. A method according to claim 5 wherein said atmosphere comprises:
approximately 85% by volume of nitrogen and 15% by volume of hydrogen.

7. A method according to claim 5 further comprising the step of:
providing gas curtains at an entrance and an exit of said enclosure.

* * * * *